United States Patent [19]

Krum et al.

[11] 4,028,471

[45] June 7, 1977

[54] YEAST LEAVENED DOUGH COMPOSITION

[75] Inventors: Jack Kern Krum, Leawood; Louis Albert Wollermann, Prairie Village, both of Kans.; Dugan Allan Rucker, Kansas City, Mo.

[73] Assignee: International Telephone and Telegraph Corporation, New York, N.Y.

[22] Filed: Dec. 1, 1975

[21] Appl. No.: 636,848

[52] U.S. Cl. ............................... 426/22; 426/532; 426/653; 426/25; 426/9

[51] Int. Cl.² .......................................... A21D 2/20

[58] Field of Search ............. 426/18, 9, 19, 22, 25, 426/532, 653

[56] References Cited

UNITED STATES PATENTS

| | | | |
|---|---|---|---|
| 1,385,842 | 7/1921 | Patterson | 426/22 |
| 2,971,845 | 2/1961 | Ferrari | 426/22 |
| 2,997,394 | 8/1961 | Melnick et al. | 426/9 |
| 3,065,080 | 11/1962 | Melnick et al. | 426/9 |
| 3,556,798 | 1/1971 | Tucker et al. | 426/551 |

*Primary Examiner*—Raymond N. Jones
*Attorney, Agent, or Firm*—J. B. Raden; H. J. Holt

[57] ABSTRACT

A yeast leavened dough composition containing, for each 100 parts by weight of flour, an additive comprising from 0.0020 to 0.0120 parts by weight of a peroxide oxidizing agent and from 0.0025 to 0.090 parts by weight of either sorbic acid or a sodium, potassium or calcium salt of sorbic acid, the ratio of peroxide to sorbate being no greater than one with more than 0.0075 parts by weight of peroxide. A baked product produced from such a composition has a number of improved characteristics including crumb resiliency, overall texture, structure and shelf life.

7 Claims, No Drawings

YEAST LEAVENED DOUGH COMPOSITION

This invention relates to yeast leavened dough compositions, to a process of preparing baked products from such compositions and to the resulting baked products.

The newer continuous dough processes have achieved extensive commercial acceptance. However, one of the major problems associated with bread produced by the continuous process is a resulting fine, soft, fragile internal structure. The structure causes a slicing problem and the individual slices tend to break or tear readily when they are handled. Bread produced by the continuous process also lacks traditional bread flavor. The taste and structural differences of bread produced by the continuous process have proven to be unappealing to the consumer.

In an effort to overcome these undesirable characteristics, commercial bakeries have produced bread by a combination of the continuous and conventional systems. These combination processes have yielded bread closely resembling that made by conventional bread-making systems, but at the cost of increased capital outlay and reduced productivity.

The use of peroxide oxidizing agents for improving the production and quality of flour-based baked products has long been known. Their dough improving qualities are disclosed, for example, in U.S. Pat. No. 1,385,842. However, peroxides also tend to produce a dough which is characterized by the baker as "bucky", that is, a dough which is tough and hard to manipulate and when stretched, tends to shrink back to its original condition.

The addition of sorbic acid to yeast leavened dough compositions is known to act as a fungistatic or anti-mycotic agent. However, at the levels necessary for such anti-mycotic effect, it interferes with yeast fermentation. It has been proposed that it be added in coated or encapsulated form to prevent interference with yeast fermentation. See for example, U.S. Pat. Nos. 2,997,394 and 3,065,080. U.S. Pat. No. 3,556,798 also discloses the addition of sorbic acid or its salts to chemically leavened dough for its mix time reduction and dough handling effects.

It is an object of the present invention to provide a dough composition which produces baked products of improved resiliency and crumb structure and of longer shelf life.

It is an additional object of this invention to provide a dough composition which delays the onset of crumb brittleness in the finished product.

A further object of this invention is to improve the sliceability of bread to permit thin slicing.

A still additional object is to create an appearance, flavor and texture in continuous mix products approaching that of conventional sponge and dough breads.

We have found that the foregoing and other objects of the invention may be achieved by the addition to a yeast leavened dough composition of small but critical proportions of a combination of a peroxide oxidizing agent and sorbic acid or one of its salts. More specifically, the invention comprises the addition to a yeast leavened dough composition, for each 100 parts by weight of flour, of from 0.0020 to 0.0120 parts by weight of a peroxide oxidizing agent and from 0.0025 to 0.090 parts by weight of sorbic acid or the sodium, potassium or calcium salt of sorbic acid, the ratio of peroxide to sorbate being no greater than one with more than 0.0075 parts by weight of peroxide. The levels of sorbic acid or its salt required for the improvements obtained in accordance with the invention are generally below that reported to provide anti-mycotic effects and are also at a level which does not prevent yeast fermentation in the bread-making process. Moreover, the presence of the combined ingredients has been found to avoid the bucky characteristic of dough containing only the peroxide.

While the improved results of the invention are obtained with flour based baked products produced by both conventional and continuous processes, the invention is particularly useful with continuous mix products. A brief description of these processes will therefor aid in an understanding of the present invention.

The conventional process involves either the "straight dough" or "sponge and dough" methods. The former is a single step process in which all of the ingredients are mixed together in a single batch. A fermentation time of about 2 to 4, or in some cases 5 hours, including time required for final proofing, its ordinarily used. The sponge and dough process uses two distinct steps, the sponge stage and the dough stage. The sponge stage involves mixing part of the dough ingredients and allowing preliminary fermentation. The sponge usually comprises 50% to 75% of the total flour, all of the yeast and yeast nutrients, sufficient water for a moderately stiff dough and dough conditioners, where used. Salt and mold inhibitor are omitted from the sponge because they inhibit fermentation. Fermentation time for the sponge is from 3 to 5 hours. In the dough stage, the fermented sponge is returned to the mixer and additional ingredients are added. These usually include the remaining flour and water, milk solids, salt, mold inhibitor, sugar and shortening. Fermentation time from this point on is twenty minutes to 2 hours. The sponge method is today the most widely used method of making bread in this country.

In the continuous method, a liquid broth or brew is prepared instead of a sponge as in the conventional system. The brew normally will utilize, under newer methods, up to 70% of the flour under conditions in which it is still a liquid-pumpable system. In addition to flour, it contains yeast, nutrients, sugar and water. It is fermented for about 1½ hours and then a "spike" containing such ingredients as extra sugar, extra yeast, enrichment, shortening, mold inhibitor and water is added to the brew and allowed to ferment for approximately another hour. The entire brew is then transferred to a continuous mix incorporator where the remaining ingredients including any remaining flour are added. It is then pumped into a developer where it is mixed at high speeds at a temperature of 100° F to 120° F for from 1½ to 2 minutes. The resulting very fluid dough is then extruded into loaf-producing sized pieces which drop into pans. The pans pass through a proofing area where the dough increases in size a predetermined amount, at which time it is sent to the ovens and baked. A more complete description of the continuous process may be found at various places in the literature, as for example, in Baking Science and Technology, Volume II, Chap. 17, Edited by E. J. Pyler (1973).

The high speed mixing used in the continuous process introduces undesirable shear and weakens the dough to a much greater extent than conventionally processed dough. The bread is a close grained, finely textured product with extremely poor crumb strength and resiliency. Finished slices of continuously produced bread have a tendency to tear easily, especially when thin-sliced, i.e., less than ½ inch width. The weak crumb structure also presents a major problem with high speed slicers where "snow" or excess crumb production is encountered. In addition, the high speed slicing of both regular (½ inch) and thin-sliced bread produced by the continuous process requires higher energy inputs and sharper blades than conventionally produced breads.

We have found quite unexpectedly that the combination of sorbic acid or its salts and a peroxide, in the amounts and proportions herein indicated, overcomes the weak crumb structure, lack of crumb resiliency and resulting slicing difficulties heretofore encountered. The bread products of the invention have a tougher crumb structure with noticeable resiliency and allow easier and more effective slicing with considerably less "snow".

An additional unexpected advantage of the invention is an extension of the shelf life of commercially produced bread. It has been found that breads produced in accordance with the invention have a one or two day delay in the onset of staling or brittleness. Still an additional advantage of the invention is a sugar sparing effect that reduces the amount of sugar consumed in fermentation —usually referred to as "burn-out" by the baker— thus improving sweetness and crust color. The flavor notes of bread, many of which do not appear in continuous mix breads, are present in the breads of the invention and impart a flavor reminiscent of bread processed by the conventional sponge and dough method.

The use of either sorbic acid alone or a peroxide alone will not produce the foregoing advantages achieved with the combination. The interaction of the two components has been found necessary to produce the improved results of the invention. Best results are achieved with the use of sorbic acid and calcium peroxide. However, in addition to sorbic acid, it is also possible to use the sodium, potassium or calcium salt of sorbic acid and particularly the potassium salt. Other useful peroxides, in addition to calcium peroxide, are hydrogen peroxide, magnesium peroxide, sodium peroxide and potassium peroxide. The sorbic acid or sorbate salt should be added in amounts of 0.0025 to 0.090 parts, preferably 0.020 to 0.060 parts by weight, based on 100 parts by weight of flour, while the peroxide should be added in an amount of from 0.0020 to 0.0120 parts, preferably 0.0030 to 0.0080 parts by weight on the same basis. With relatively large amounts of peroxide, it has been found that at least an equal amount of sorbic acid is necessary and thus the ratio of peroxide to sorbate should not be greater than one (1:1) on a weight basis, when more than 0.0075 parts of peroxide are used.

The peroxide and sorbate ingredients may be added at the same time, preferably at the beginning of the sponge stage in the sponge and dough process or at the beginning of the fermentation of the brew in the continuous process. They may be added later —during the dough stage of the sponge and dough process or the spike stage of the continuous process— but the earlier addition is more effective.

The following examples illustrate the practice of the invention. All parts and percentages are by weight unless otherwise indicated.

EXAMPLE 1

A white bread was produced by the continuous process from the following ingredients:

| Ingredient | Parts by Weight |
| --- | --- |
| Flour | 100.0 |
| Yeast | 2.5 |
| Yeast Food | 0.45 |
| Water | 65.0 |
| Liquid Dextrose (71% S.S.) | 8.0 |
| Salt | 2.0 |
| Whey Powder | 0.5 |
| Shortening | 3.0 |
| Mold Inhibitors (Calcium propionate and Sodium diacetate) | 0.13 |
| Potassium Bromate | 0.004 |
| Potassium Iodate | 0.004 |
| Calcium Peroxide | 0.002 |
| Sorbic Acid | 0.050 |
| Emulsifier | 0.40 |

The bread was prepared by placing sixty parts of the flour and 60.0 parts of the water in a mixing tank while agitating. Water temperature was selected to achieve a final brew temperature of 83°–84° F. To this was added the following ingredients:

| Ingredient | Part |
| --- | --- |
| Whey Powder | 0.5 |
| Calcium Peroxide | 0.002 |
| Sorbic Acid | 0.05 |
| Emulsifier | 0.4 |
| Mold Inhibitor | 0.05 |
| Shortening | 3.0 |

The mixture was agitated for approximately 40 minutes and then transferred to another tank equipped with slow speed agitation. At this point, the following slurry, consisting of the remaining water and mold inhibitor and all of the salt, was added:

| | |
| --- | --- |
| Water | 5.0 |
| Mold Inhibitor | 0.08 |
| Salt | 2.0 |

The resulting mixture was held for approximately 2.5 hours and then transferred to a second holding tank used to feed the continuous bread making machines. The temperature at this point was 88° F. This composition was the "brew". Controlled amounts of this brew, the liquid dextrose and the remaining 40 parts of flour were fed to the continuous mix machine, mixed, extruded into baking pans and the resulting dough proofed. At this point, the dough temperature was about 105° to 115° F. The dough was baked at 460° F for 13–15 minutes and cooled for 50–70 minutes at room temperature. The bread was then sliced into one-fourth inch slices.

The improved consumer acceptance of this bread was evaluated by a taste panel study comparing it with a control (without calcium peroxide and sorbic acid) at 2 and 8 days after baking. Both one-fourth and one-half inch slices were compared.

Bread was rated on a scale of 0 to 9 for quality and a preference vote as to which seemed fresher. Only at the 2 day examination of the ½ inch sliced breads did the panelists fail to report a statistically significant preference for the test bread.

TABLE I

|  | 9 Point Mean Scale Ratings | Number Of Panelists | % Fresher Judgments |
|---|---|---|---|
| 2 Day Test |  |  |  |
| Test Formulation (Thin Sliced) | 7.4 |  | 68* |
| vs. |  | 39 |  |
| Control Formulation (Thin Sliced) | 7.1 |  | 32 |
| Test Formulation (Thick Sliced) | 6.8 |  | 59 |
| vs. |  | 38 |  |
| Control Formulation (Thick Sliced) | 6.9 |  | 41 |
| 8 Day Test |  |  |  |
| Test Formulation (Thin Sliced) | 6.9 |  | 68* |
| vs. |  | 33 |  |
| Control Formulation (Thin Sliced) | 6.9 |  | 32 |
| Test Formulation (Thick sliced) | 6.8 |  | 75* |
| vs. |  | 33 |  |
| Control Formulation (Thick sliced) | 6.4 |  | 25 |

*Statistically significant at the 5% level.

EXAMPLE 2

White bread was prepared by the conventional batch process from the following formula:

| Ingredient | Parts |  |
|---|---|---|
| Flour | 100.0 |  |
| Yeast | 2.5 |  |
| Yeast Food | 0.5 |  |
| Water | 68.0 | (64 for control) |
| Dextrose | 9.4 | |
|  |  | 11.7 as syrup |
| Water | 2.3 | |
| Salt | 2.0 |  |
| Whey | 1.5 |  |
| Soy Flour | 1.5 |  |
| Shortening | 2.5 |  |
| Emulsifier | 0.8 |  |
| Mold Inhibitor | 0.125 |  |
| Dough Conditioner[1] | 0.25 |  |
| Sorbic Acid[2] | 0 to 0.0150 |  |
| Calcium Peroxide[2] | 0 to 0.0075 |  |

[1] A bleaching agent containing 0.75% (0.0019 parts) of $CaO_2$, balance (0.2481 parts) enzyme active soy flour.
[2] The sorbic acid and calcium peroxide were added as a blend in a whey carrier.

Four samples of bread were prepared from the above bread formula by the conventional sponge and dough process. (It should be noted that all four samples in this example contained 0.0019 parts of calcium peroxide in the dough conditioner, so that the total amount of peroxide is the amount added plus the 0.0019 parts present in the conditioner). The sponge consisted of 65 parts of the flour, the yeast food, yeast and 41.6 parts of the water. The yeast was emulsified in a portion of the sponge water prior to flour addition. The ingredients were mixed while a temperature of 80° F was maintained in the sponge and then fermented for four hours at a constant temperature of 80° F and a constant relative humidity of 91%. The whey powder, salt and dextrose were thoroughly mixed and added as a unit along with the remaining ingredients of the formula to the fermented sponge, which was remixed. The remixed dough came from the mixer at 82° F and was fermented for 40 minutes, scaled and then allowed a 10 minute recovery period, placed in a proofing cabinet for about one hour at 110° F (dry bulb) temperature and 84% relative humidity. The dough was placed in pans, allowed to rise, baked 19 minutes at 415° F and cooled for 60 minutes.

All of the samples were evaluated for slicing character by use of an Oliver Slicing Machine designed to produce 1/4 inch slices. The first sample contained no sorbic acid or added calcium peroxide over the 0.0019 parts present in the conditioner. It was deformed by the slicer into slices of about one half their normal cross-sectional area and exhibited torn and compressed areas on the surface. Numerous small striations were evident on the surface of the slice where the crumb had been compressed into gummy streaks resembling unbaked dough.

The second sample contained 0.0025 parts of added calcium peroxide (total 0.0044 parts) and 0.0050 parts of sorbic acid. It exhibited a slight tendency to compress while going through the slicer but recovered its size and shape upon emerging from the blades. It exhibited a few short striations, but still retained the essentially porous surface appearance of sliced white bread and was noticeably superior to the control Sample 1. Sample 3 contained 0.0050 parts of added peroxide and 0.010 parts of sorbic acid while Sample 4 contained 0.0075 parts of added peroxide and 0.0150 parts of sorbic acid. Both Samples 3 and 4 produced bread which sliced quite readily at one-fourth inch thickness without exhibiting any deformation or striations of compressed or gummy crumb.

EXAMPLE 3

White bread was prepared by the sponge and dough process as set forth in Example 2 from the following formula:

| Sponge | Percent | Dough | Percent |
|---|---|---|---|
| Flour | 65.000 | Flour | 35.000 |
| Yeast | 3.000 | Lard | 3.000 |
| Water | 43.000 | Water | 23.500 |
| Dextrose | 1.000 | Dextrose | 7.000 |
| Whey Powder | 1.000 | Salt | 2.250 |
| Yeast Food | 0.625 |  |  |
| Beaded Monoglyceride/ Ethoxylated Monoglyceride Mixture | 0.325 |  |  |
| Calcium Propionate | 0.250 |  |  |
| Calcium Peroxide | 0.00375 |  |  |
| Sorbic Acid | 0.00250 |  |  |

The process conditions were as follows:

| Sponge Mix | 4 minutes |
| Absorption | 66.5% based on flour weight |
| Sponge Fermentation | 2½ hours |
| Remix | 6 minutes |
| Dough Fermentation | ½ hour |
| Scaling | 16 oz./loaf |
| Proofing | to ¾" below pan rim |
| Baking | 19 minutes at 415° F |

A second control sample was prepared in accordance with the above Example, but 0.00375 parts of calcium peroxide alone, i.e., no sorbic acid, was added to the dough stage. Where calcium peroxide is used, it is standard practice in the baking industry to add it to the dough stage.

The bread from Example 3 and the control sample were evaluated by measuring specific volumes, internal and external scores according to the standard American Institute of Baking procedure and compressibilities with a Precision Penetrometer and a 3 cm. cylindrical plunger as described in U.S. Pat. No. 3,360,375. The relative importance of the internal and external quality factors are shown by the total points alloted in the following table.

| External | | Internal | |
|---|---|---|---|
| Volume | 10 | Grain | 19 |
| Crust Color | 3 | Crumb Color | 12 |
| Symmetry | 3 | Aroma | 10 |
| Evenness of Bake | 3 | Taste | 10 |
| Crust Character | 3 | Chewability | 12 |
| Break and Shred | 3 | Texture | 12 |
| | 25 | | 75 |

Compressibilities and quality rating tests were performed every 48 hours beginning at 48 hours after baking. The results of the tests are shown in Table II.

TABLE II

| | Control | Example 3 |
|---|---|---|
| Specific Volume | 5.98 cc/g | 6.11 cc/g |
| External Score | 17.5 | 19.5 |
| Internal Score | 62.5 | 67.5 |
| Total Score | 80.2 | 87.0 |
| Average Proof Time | 56.0 minutes | 56.5 minutes |
| Days | Compressibility (mm × 10) | |
| 2 | 189 | 199 |
| 4 | 139 | 153 |

EXAMPLE 4

This example was identical to Example 3 except that 0.050 parts by weight of sorbic acid was used. Calcium peroxide levels were again 0.00375 parts by weight in both this example and the control. Results are shown in Table III.

TABLE III

| | Control | Example 4 |
|---|---|---|
| Specific Volume | 5.94 | 6.24 |
| External Score | 15.5 | 19.6 |
| Internal Score | 63.0 | 67.5 |
| Total Score | 78.5 | 87.0 |
| Average Proof Time | 57-¾ min. | 71-¾ min. |
| Days | Compressibility (mm × 10) | |
| 2 | 201 | 212 |
| 4 | 153 | 173 |

EXAMPLE 5

Example 3 was again repeated substituting 0.08 parts by weight of sorbic acid. Calcium peroxide levels were kept at 0.00375 parts. The amount of sorbic acid —0.0880 parts — is still below that reported to have significant anti-mycotic effect (0.10 parts or 1000 parts per million). The results are shown in Table IV.

TABLE IV

| | Control | Example 5 |
|---|---|---|
| Specific Volume | 6.05 | 6.43 |
| External Score | 18.2 | 22.0 |
| Internal Score | 63.0 | 66.0 |
| Total Score | 81.2 | 88.0 |
| Average Proof Time | 57 min. | 79 min. |
| Days | Compressibility (mm × 10) | |
| 2 | 160 | 170 |
| 4 | 142 | 152 |

EXAMPLE 6

This example was identical to Example 3 except that 0.100 parts by weight of sorbic acid (an amount outside the scope of the invention) was used.

The results were as follows:

TABLE V

| | Control | Example 6 |
|---|---|---|
| Specific Volume | 6.01 | 6.25 |
| External Score | 17.5 | 20.7 |
| Internal Score | 64.5 | 64.0 |
| Total Score | 82.0 | 84.7 |
| Average Proof Time | 53.5 minutes | 87.2 minutes |
| Days | Compressibility (mm × 10) | |
| 2 | 180 | 171 |
| 4 | 142 | 136 |

While the score results and specific volume were better than the control for Example 6, this improvement does not compensate for the decreased softness or compressibility of the bread. Moreover, the decrease in compressibility was found to continue beyond the 4 day period for which results are shown in Table III. At the end of 12 days, compressibility of the control sample was 79, while Example 6 was 71.

Examples 3, 4, 5 and 6 thus indicate that at a constant 0.00375 parts by weight of peroxide, improved bread quality is achieved with levels of sorbic acid ranging from 0.0025 to 0.080 parts by weight; that the improvement is not obtained with the peroxide alone; and that levels of sorbic acid as high as 0.1 parts by weight are excessive in terms of bread quality.

In the following examples 7–12, the level of calcium peroxide was maintained at 0.0090 parts by weight in both the examples and the controls, while the level of sorbic acid was varied from 0.002 to 0.050 parts by weight. The formulae and the process of bread preparation were otherwise as set forth in Example 3.

EXAMPLE 7

Table VI compares the results of a control containing 0.0090 parts of calcium peroxide with Example 7 containing both this level of peroxide and 0.002 parts by weight of sorbic acid. The ratio of peroxide to sorbic acid in this example is greater than one, which at a level of 0.0090 peroxide, is outside the scope of the invention.

TABLE VI

| | Control | Example 7 |
|---|---|---|
| Specific Volume | 6.09 cc/g | 5.91 cc/g |
| External Score | 16.4 | 15.7 |
| Internal Score | 66.0 | 64.5 |
| Total Score | 82.4 | 80.2 |
| Average Proof Time | 56.0 min. | 57.2 min. |
| Days | Compressibility (mm × 10) | |
| 2 | 181 | 176 |
| 6 | 108 | 108 |

EXAMPLE 8

In Table VII, the control contained 0.0090 parts of calcium peroxide while Example 8 contained 0.0090 parts of the peroxide and 0.0060 parts by weight of sorbic acid. Again, this ratio of peroxide to sorbic acid is greater than one and thus outside the scope of the invention.

TABLE VII

|  | Control | Example 8 |
| --- | --- | --- |
| Specific Volume | 6.09 cc/g | 6.11 cc/g |
| External Score | 16.4 | 16.7 |
| Internal Score | 66.0 | 64.5 |
| Total Score | 82.4 | 81.2 |
| Average Proof Time | 56.0 min. | 58.0 min. |
| Days | Compressibility (mm × 10) | |
| 2 | 181 | 186 |
| 6 | 108 | 112 |

EXAMPLE 9

In Table VIII, both the control and Example 9 contained 0.0090 parts of calcium peroxide, while Example 9 contained in addition 0.010 parts of sorbic acid.

TABLE VIII

|  | Control | Example 9 |
| --- | --- | --- |
| Specific Volume | 6.09 cc/g | 6.11 cc/g |
| External Score | 16.4 | 19.7 |
| Internal Score | 66.0 | 68.0 |
| Total Score | 82.4 | 87.7 |
| Average Proof Time | 56.0 min. | 59.0 min. |
| Days | Compressibility (mm × 10) | |
| 2 | 181 | 196 |
| 6 | 108 | 119 |

EXAMPLE 10

In Table IX, both the control and Example 10 contained 0.0090 parts of calcium peroxide, while Example 10 contained in addition 0.0420 parts of sorbic acid.

TABLE IX

|  | Control | Example 10 |
| --- | --- | --- |
| Specific Volume | 6.09 cc/g | 6.19 cc/g |
| External Score | 16.4 | 19.2 |
| Internal Score | 66.0 | 64.0 |
| Total Score | 82.4 | 83.2 |
| Average Proof Time | 56.0 min. | 61.0 min. |
| Days | Compressibility (mm × 10) | |
| 2 | 181 | 186 |
| 6 | 108 | 119 |

EXAMPLE 11

In Table X, both the control and Example 11 again contained 0.0090 parts of calcium peroxide, while Example 11 contained in addition 0.0460 parts of sorbic acid.

TABLE X

|  | Control | Example 11 |
| --- | --- | --- |
| Specific Volume | 6.09 cc/g | 6.25 cc/g |
| External Score | 16.4 | 19.2 |
| Internal Score | 66.0 | 64.5 |
| Total Score | 82.4 | 83.7 |
| Average Proof Time | 56.0 min. | 60.0 min. |
| Days | Compressibility (mm × 10) | |
| 2 | 181 | 189 |
| 6 | 108 | 126 |

EXAMPLE 12

In Table XI, both the control and Example 12 contained 0.0090 parts of calcium peroxide, while Example 12 contained in addition 0.050 parts of sorbic acid.

TABLE XI

|  | Control | Example 12 |
| --- | --- | --- |
| Specific Volume | 6.09 cc/g | 6.20 cc/g |
| External Score | 16.4 | 19.0 |
| Internal Score | 66.0 | 64.5 |
| Total Score | 82.4 | 83.5 |
| Average Proof Time | 56.0 min. | 60.0 min. |
| Days | Compressibility (mm × 10) | |
| 2 | 181 | 193 |
| 6 | 108 | 122 |

Examples 7–12 thus illustrate that with higher levels of peroxide (over 0.0075 parts), at least an equivalent amount of sorbic acid must be used to overcome the deleterious effects of the high level of calcium peroxide.

EXAMPLE 13

This example compares a bread sample containing a high level of calcium peroxide (0.0125 parts) and an intermediate level of sorbic acid (0.050). This is an amount of peroxide above the maximum level of 0.0120 and accordingly outside the scope of the invention. The control was prepared without calcium peroxide. At this level of peroxide without the modulating effect of sorbic acid, it would have been almost impossible to process the dough and the finished bread would have been of such inferior quality as to afford an unrealistic comparison with the Example.

TABLE XII

|  | Control | Example 13 |
| --- | --- | --- |
| Specific Volume | 6.28 | 5.65 |
| External Score | 19.2 | 15.7 |
| Internal Score | 67.0 | 61.0 |
| Total Score | 86.2 | 76.7 |
| Average Proof Time | 58 min. | 65 min. |
| Days | Compressibility (mm × 10) | |
| 2 | 200 | 164 |
| 4 | 156 | 127 |

EXAMPLE 14

This example was similar to Example 13, except that a relatively high level (0.080 parts) of sorbic acid was combined with the high level (0.0125 parts) of calcium peroxide. It was impossible to prepare suitable dough for make-up and baking when using this combination. Stiff and dry-feeling sponges were re-mixed with the dough ingredients and the specified amount of water on the dough side of the formula. At the completion of the re-mix, the doughs were too wet and sticky to be able to remove them from the mixing bowl. An additional 4 minutes mixing resulted in a worse condition rather than a "clean-up". Successive trials in which the amount of "dough water" added was reduced in increments to about 70% of the original level all resulted in the same condition. No further processing of these doughs was carried out.

EXAMPLE 15

A series of experiments were run to determine the effect on crumb quality of varying the ratios and amounts of sorbic acid and calcium peroxide. Parts per million of calcium peroxide were varied from 0 to 108 in 21.6 ppm intervals. Parts per million of sorbic acid were varied from 0 to 450 in 90 ppm intervals. Four levels of work input were also selected, namely 1, 1.2, 1.4 and 1.6 kilowatt hours per pound of dough. A pilot model continuous mix breadmaking machine was used. The bread formula used was as follows:

|  | % |
| --- | --- |
| Flour | 100.0 |
| Water | 62.0 |
| Yeast | 3.0 |
| Yeast Food | 0.625 |
| Calcium Acid Phosphate | 0.2 |
| Dextrose Hydrate | 10.0 |
| Fungal Enzyme Mixture | 0.2 |
| Salt | 2.25 |
| Whey/Soy Flour Blend | 2.0 |
| Sodium Stearoyl Lactylate | 0.25 |
| Hydrated Mono Glycerides | 0.75 |
| Sorbic Acid | variable (0.0025 – 0.090) |
| Calcium Peroxide | variable (0.002 – 0.012) |

The bread samples were then given a crumb quality rating based upon how close the sample approached the resilient, open crumb structure of conventional bread. The specific crumb character ratings were open, medium, fine and extra fine.

The results of these tests indicated the following: (1) crumb quality was a function of the level of both sorbic acid and calcium peroxide, (2) a decrease of the level of one additive required an increase in the level of the other to produce an equivalent crumb structure and (3) the ratio of sorbic acid to calcium peroxide had a non-linear relationship to crumb quality. Thus, for amounts of sorbic acid at the upper end of the range tested, e.g., 400 to 450 ppm, ratios of sorbic acid to peroxide to obtain an open crumb structure were relatively large, e.g., over 20. At the lower end of the range tested, e.g., 25 ppm of sorbic acid, small ratios of sorbic acid to peroxide gave the same crumb structure —e.g., ratios of less than one. This pattern was repeated for each of the crumb ratings over the four work input levels tested. Such an interrelationship demonstrates that the peroxide and the sorbic acid each influences and interacts with the other. If each of the compounds had a simple additive (or subtractive effect on crumb quality, their relationship would be a straight line function.

This invention thus provides a baked product of improved quality and particularly resiliency and crumb structure by the combined addition of small but critical proportions of both a peroxide oxidation agent and sorbic acid or one of its salts.

We claim:

1. A process for preparing a baked product of improved resiliency and crumb structure from a yeast leavened dough composition which comprises adding to said composition, for each 100 parts by weight of flour, an additive comprising from 0.0020 to 0.0120 parts by weight of a peroxide oxidizing agent and from 0.0025 to 0.090 parts by weight of a sorbate selected from the group consisting of sorbic acid and the sodium, potassium and calcium salts of sorbic acid, the ratio of peroxide to sorbate being no greater than one with more than 0.0075 parts by weight of peroxide, and baking said dough composition, whereby a yeast leavened baked product is produced capable of being more thinly sliced than a baked product not containing said additive.

2. In a process for preparing a baked product of improved resiliency and crumb structure from a yeast leavened dough composition by the continuous process wherein the dough composition is prepared and transferred to a developer where it is mixed at high speed to form a dough and said dough is then baked, the improvement comprising, adding to said dough composition an additive which contains, for each 100 parts by weight of flour, from 0.0020 to 0.0120 parts by weight of a peroxide oxidizing agent and from 0.0025 to 0.090 parts by weight of a sorbate selected from the group consisting of sorbic acid and the sodium, potassium and calcium salts of sorbic acid, the ratio of peroxide to sorbate being no greater than one with more than 0.0075 parts by weight of peroxide, whereby a yeast leavened baked product is produced capable of being more thinly sliced than a baked product not containing said additive.

3. A yeast leavened dough composition for use in producing baked products of improved resiliency and crumb structure, said dough composition having incorporated therein from 0.0020 to 0.0120 parts by weight of a peroxide oxidizing agent and from 0.0025 to 0.090 parts by weight of a sorbate selected from the group consisting of sorbic acid and the sodium, potassium and calcium salts of sorbic acid, the ratio of peroxide to sorbate being no greater than one with more than 0.0075 parts by weight of peroxide, said parts by weight being based upon each 100 parts by weight of flour contained in said yeast leavened dough composition.

4. The yeast leavened dough composition of claim 3 comprising from 0.0030 to 0.0080 parts by weight of the peroxide and from 0.020 to 0.060 parts by weight of the sorbate.

5. The yeast leavened dough composition of claim 3 in which the peroxide is calcium peroxide.

6. The yeast leavened dough composition of claim 3 in which the sorbate is sorbic acid.

7. A bread product of improved resiliency and crumb structure produced by baking a yeast leavened dough composition containing flour, water, yeast leavening and salt, said composition containing for each 100 parts by weight of flour, an additive comprising 0.0020 to 0.0120 parts by weight of a peroxide oxidizing agent and from 0.0025 to 0.090 parts by weight of a sorbate selected from the group consisting of sorbic acid and the sodium, potassium and calcium salts of sorbic acid, the ratio of peroxide to sorbate being no greater than one with more than 0.0075 parts by weight of peroxide.

* * * * *